June 3, 1958 D. G. McLAUGHLIN 2,837,242
APPARATUS FOR DISPENSING VISCOUS MATERIAL
Filed Nov. 9, 1956 2 Sheets-Sheet 1
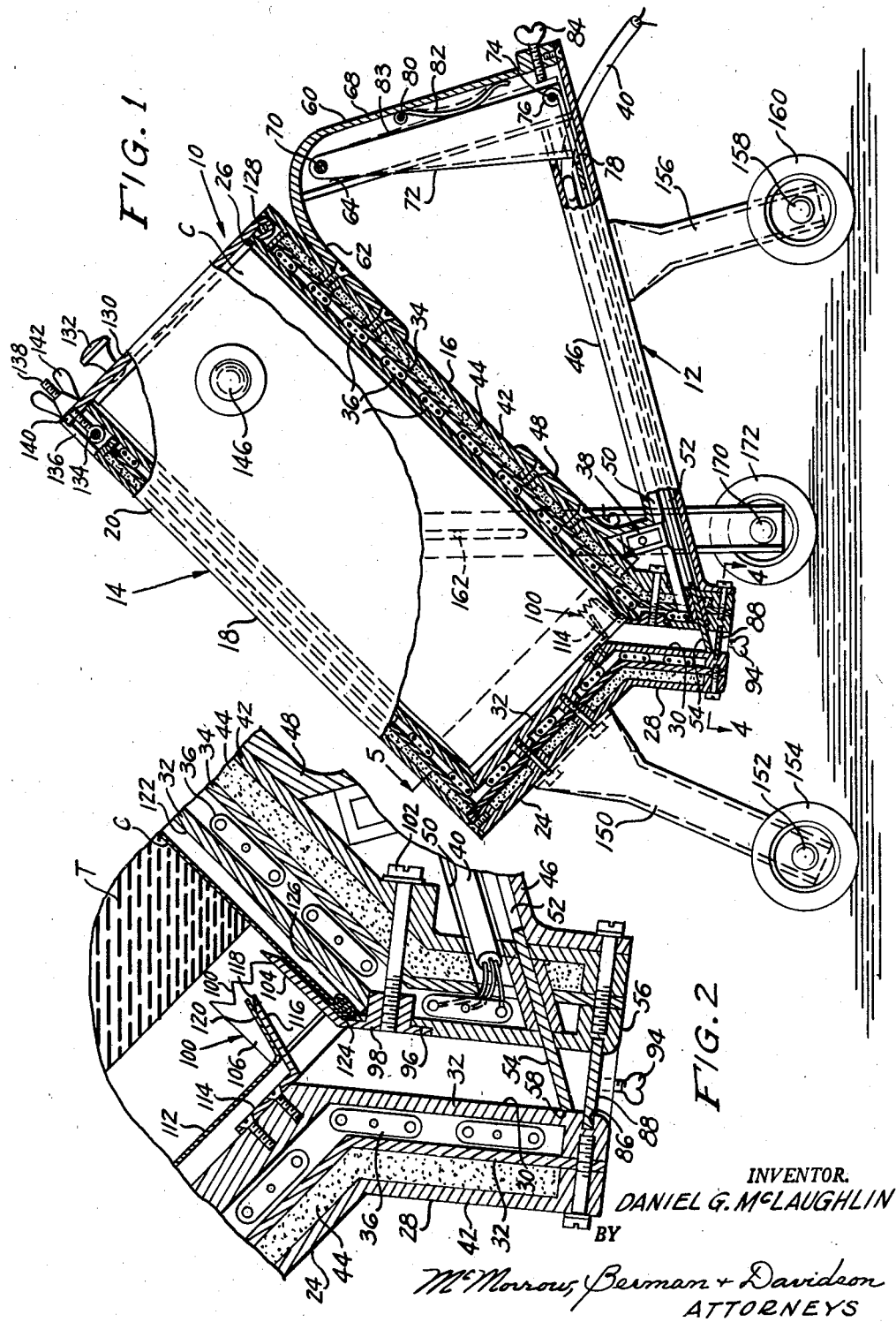
INVENTOR.
DANIEL G. McLAUGHLIN
BY
McMorrow, Berman + Davidson
ATTORNEYS June 3, 1958 D. G. McLAUGHLIN 2,837,242
APPARATUS FOR DISPENSING VISCOUS MATERIAL
Filed Nov. 9, 1956 2 Sheets-Sheet 2
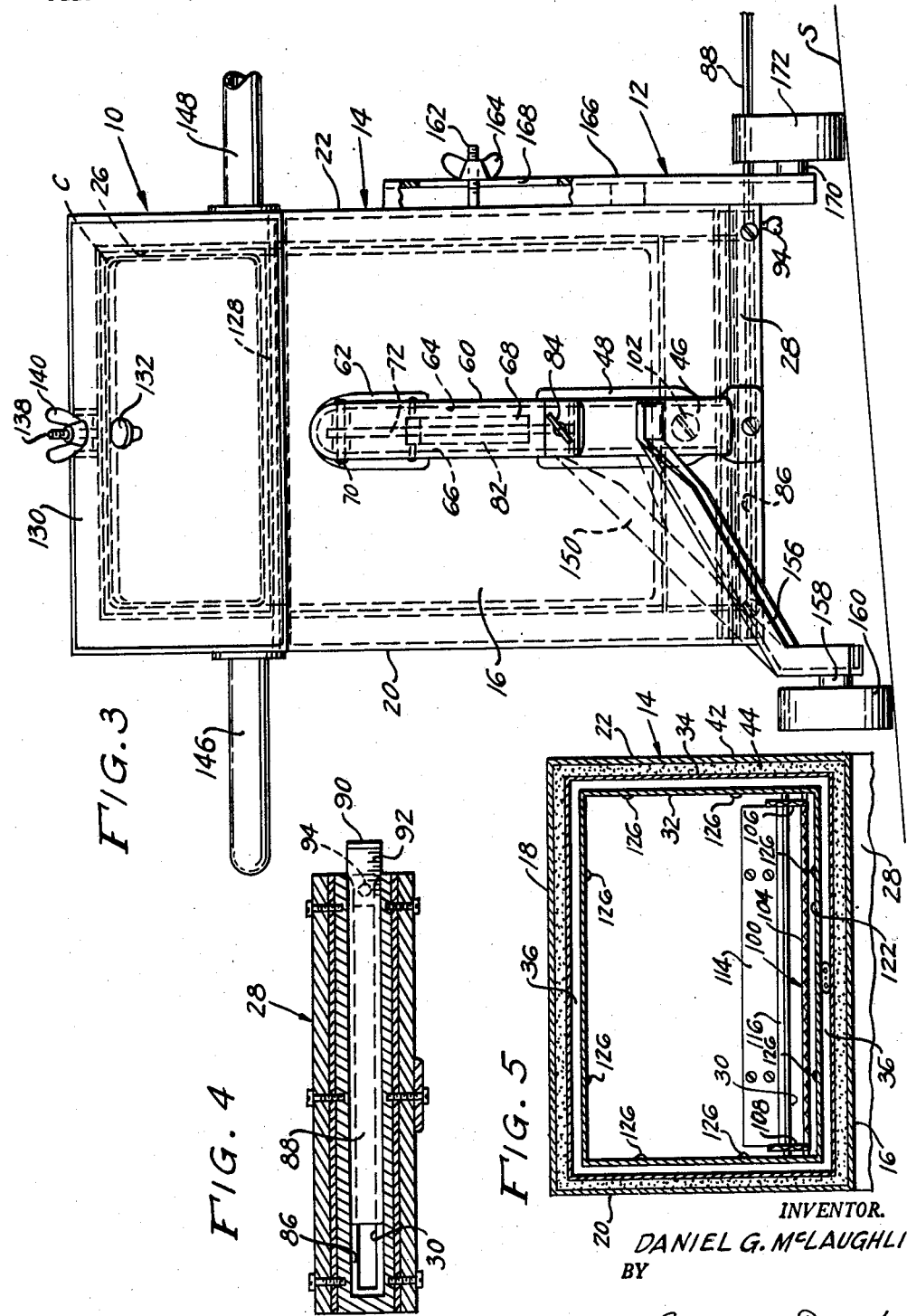
INVENTOR.
DANIEL G. McLAUGHLIN
BY
McMorrow, Berman + Davidson
ATTORNEYS

United States Patent Office 2,837,242
Patented June 3, 1958

2,837,242

APPARATUS FOR DISPENSING VISCOUS MATERIAL

Daniel G. McLaughlin, Opa Locka, Fla.

Application November 9, 1956, Serial No. 621,376

4 Claims. (Cl. 222—88)

This invention relates generally to novel apparatus for dispensing viscous material and is more particularly adapted for dispensing hot tar utilized as a roofing material, for example, on relatively shallow pitched roofs which have disposed thereon a coating of hot tar upon which a plurality of marble chips or the like are applied.

Various means have been heretofore suggested for the purpose of dispensing a layer of hot tar on a surface when applying a roof to the same. The tar must be heated to a relatively high temperature in order to have the proper viscosity to permit ready spreading of the same, this relatively hot tar constituting a source of potential injury to the workmen. Furthermore, as heretofore done in the past, the relatively hot tar was spread by means of hand manipulated brushes, for example, resulting in an uneven thickness of application of the coating of hot tar as well as causing injury to the workmen themselves or destruction of their clothes, this procedure of application generally proving unsatisfactory.

A primary object of invention is to provide apparatus for dispensing viscous material such as tar or the like, said apparatus incorporating means wherein a quantity of heated viscous material may be readily moved across a surface to be coated, further including means wherein a container for the tar may be readily supported, said container being punctured permitting the dispensing of the tar contained therein, and further including means whereby the hot viscous material may be readily dispensed at a predetermined rate-of-flow with a minimum amount of danger to an individual operating the apparatus and a maximum amount of efficiency.

A further object of invention in conformance with that set forth is to provide novel apparatus for dispensing viscous material such as hot tar or the like, said apparatus incorporating a vehicular carriage including a tubular housing thereon, said housing receiving therein a severable container which when disposed in the tubular housing will be opened for dispensing tar contained therein in a ready and expeditious controlled manner.

A still further object of invention in conformance with that set forth is to provide novel apparatus for dispensing viscous material, said apparatus including means for heating a container which has the viscous material disposed therein, said apparatus further including a vehicular carriage readily propelled over a surface upon which the viscous material is to be dispensed, said apparatus including means for adjustably metering the rate-of-flow of viscous material from the apparatus as well as controlling the flow from the same, and further including means for readily and expeditiously opening a severable container deposited in the apparatus for permitting viscous material contained therein to be readily dispensed.

And a still further object of invention in conformance with that set forth is to provide novel apparatus of the character involved which is readily and economically manufactured, easily used and maintained, and highly safe, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a side elevation of the novel apparatus with portions broken away and shown in section for clarity;

Figure 2 is an enlarged view of a fragmentary portion of Figure 1 showing details of construction;

Figure 3 is an end elevation of the apparatus looking from right to left at Figure 1, portions being broken away and shown in section;

Figure 4 is a section taken substantially on the plane of line 4—4 of Figure 1; and Figure 5 is a fragmentary section taken substantially on the plane of line 5—5 of Figure 1.

Referring to the drawing in detail, apparatus for dispensing viscous material is indicated generally at 10, said apparatus including a vehicular carriage 12 having supported thereon in vertically extending angular relationship a tubular housing member 14. The vehicular carriage 12 and tubular housing member 14 are secured together to form an integral unit as will subsequently become apparent.

The tubular housing member 14 is substantially rectangular in configuration but may readily conform to any other suitable shape, for example, having a circular cross section for example. The housing member 14 includes bottom and top walls 16 and 18, respectively, side walls 20 and 22, a forward end wall 24, and a rear open end 26, for receiving therein a suitable severable container C of any suitable material, which will contain therein a viscous material such as tar or the like to ultimately be dispensed in a relatively uniform layer as the apparatus is being propelled thereover. The tubular housing member 14 has integral therewith at the intersection of the bottom wall 16 and forward end wall 24 a transverse depending discharge nozzle 28 incorporating a discharge opening 30 starting from the inner periphery of the inner surface of the bottom wall 16 and extending a substantial distance vertically of the end wall 24, see Figures 1 and 2, for example.

The cross sectional construction of the different walls and nozzle are substantially identical including an inner shell 32 of any suitable material having spaced therefrom an intermediate wall 34 and disposed therebetween are a plurality of electrical heating elements 36 operatively connected to a suitable switch 38 which in turn is connected to an electrical conduit 40 to be plugged into a source of electrical energy. Spaced from the partition 34 is an exterior wall 42 defining with the partition 34 a compartment for receiving therein a suitable insulation material 44 for maintaining a predetermined temperature within the tubular housing member 14.

Extending rearwardly from an intermediate portion of the discharge nozzle 28 in angular underlying relationship relative to the bottom wall 16 is an elongated substantially planar support member 46 which has extending between the upper surface thereof and the under surface of the bottom wall 16 a suitably secured support bracket 48. The member 46 incorporates a hollow interior 50 through which the electrical conduit 40 extends, see Figure 2. The hollow interior 50 in member 46 reciprocably supports on the lower surface thereof an elongated control plate 52, the forward end of which is indicated at 54 extending through a suitable transverse slot 56 formed in one side of the discharge nozzle 28, said portion 54 of the control plate 52 terminating in a beveled edge 58 engageable with one side of the discharge portion 30.

The rear end of member 46 terminates in an upwardly extending combined support and handle portion 60 terminating at its upper end in an arcuate portion 62 underlying a portion of the bottom wall 16 of the housing member 14 and being suitably secured thereto. The member 46 incorporates a pair of mutually parallel vertically extending support portions or plates 64 and 66 which have extending transversely between opposed rear edge portions thereof a transverse web portion 68. Extending transversely between the plates 64 and 66 is a suitably secured support shaft 70 having rotatably supported thereon an elongated trigger member 72 which extends forwardly beyond the forwardmost end of the flanges or plates 64 and 66. The lower end of the trigger 72 incorporates a transverse aperture therethrough receiving therethrough a support shaft 74. The shaft 74 extends through a pair of aligned tubular sleeve portions integral with the upper surface of the control plate 52, said sleeve portions being indicated at 76 in Figure 1, and being disposed on opposite sides of an elongated slot portion 78 opening into the rear edge of the control plate 52 for permitting arcuate movement of the control lever 72 in the path indicated by the dotted arcuate direction arrow of Figure 1. Movement in this direction of the trigger 72 will result in rearward movement of the control plate 52 and accordingly permit the discharge portion 30 of the apparatus to be opened wherein a free flowing viscous material may be readily dispensed therethrough. Suitably secured on the previously mentioned plates 64 and 66 is a support shaft 80 which has depending therefrom a leaf spring 82 in alignment with the rear edge 83 of the trigger 72 accordingly providing means wherein the control plate 52 will maintain the discharge portion 30 closed and prevent the viscous material from being dispensed therethrough. Web 68 has extending transversely through the lower end thereof in a suitably tapped bore portion an adjustable abutment screw 84 which is adjustable toward and away from the lower edge portion of the trigger 72 and accordingly providing means wherein the amount the discharge portion 30 is open is constant, said abutment screw 84 insuring that the same opening will open each time the trigger 72 is manually depressed as previously mentioned.

The discharge nozzle 28 has extending therethrough on one side thereof, see Figures 2 and 4, for example, a rectangular shaped slot portion 86 reciprocably receiving therein a rectangular control plate 88 for controlling the size of the discharge opening 30 and accordingly the maximum rate-of-flow therethrough. The plate 88 incorporates on the upper surface thereof on the end 90 extending out of the discharge portion 28 indicia 92 utilized for determining the size of the opening of the discharge portion 30 when the plate 88 is extended out of the slot 86 in the manner shown in Figure 4. Extending vertically through a suitable apertured portion of the discharge nozzle 28 is a lock screw 94 lockingly engageable with the under surface of the control plate 88 for maintaining the discharge opening 30 constant.

The discharge portion 30 incorporates at the intersection with the inner surface of wall 16 a transverse suitable recess portion 96 for receiving therein a suitably conformed lower end portion 98 of a suitably conformed knife blade indicated generally at 100 comprising a portion of a container-opening assembly in the tubular housing member. The sharpened knife blade 100 is removably retained in the housing member by means of suitable fastening bolts 102 extending transversely across the housing member at the intersection between the nozzle portion 28 and the bottom wall 16, see Figure 2. It will be noted that the discharge portion 30 defines a transverse slot or aperture at the intersection between the bottom and end walls 24, the knife 100 extends rearwardly from this transverse aperture or slot portion including a bottom portion 104 and side portions 106 and 108 which terminate in a rearwardly extending sharpened edge 110, defining a substantially U-shape when viewed in elevation, see Figure 5, for severing in the end wall 112 of the container C a U-shaped cut when the container C is urged downwardly in the tubular housing member. Suitably secured on the inner surface of the end wall 24, see Figure 2, is a transverse abutment plate 114 incorporating an abutment flange portion 116 extending between opposed inner surfaces of the sides 106 and 108 of the knife and extending angularly toward the inner surface of the bottom wall 16 of the tubular housing member, the terminal end portion of which as indicated at 118 terminating short of the sharpened edge of the knife. Accordingly, after the knife has cut into the end 112 of the container C, the abutment plate will urge the portion indicated at 120 constituting the U-shaped cut inwardly within the container C permitting the viscous material such as tar T to be dispensed through the discharge nozzle through the utilization of the controls previously described.

Portion 104 of the blade 100 is disposed in spaced parallel relationship from the inner surface 122 of the lower bottom wall 16 for permitting the forward edge 124, see Figure 2 again, of the container C to pass therebeneath. Incorporated on the inner periphery of the housing member on the bottom, top and side walls thereof are a plurality of tapered abutment portions or elements 126 which extend from the inner periphery of said walls toward the forward wall 24 providing means for properly orienting the forward end of the container toward the knife blade 100. The container C will be properly dimensioned to provide sufficient clearance between the outer surface thereof and the aforementioned bottom, top and side walls to permit air to escape thereby when said container is inserted into the tubular housing member. In view of the angular disposition of the tubular housing member the container will fall or gravitate rapidly toward the knife 100 severing the forward end thereof as is readily apparent in Figure 2.

The bottom wall 16 has extending transversely thereacross below the open end 26 of the tubular housing member a support shaft 128 pivotally supporting a cover member 130 which includes a suitably secured knob or handle 132 extending laterally from its outer surface. Pivotally supported on a suitable support shaft 134 in an open notch portion 136 of the upper wall 18 adjacent the rear edge thereof is a connecting bolt 138 which may be pivoted into an upward opening notch portion 140 in the upper edge of cover 130. A suitable finger manipulable wing nut 142 is engageable on the outer threaded surface of the bolt 138 and may be utilized for forcibly engaging the rear end portion of the container C for urging the same into the tubular housing member 14 and thus forcing the forward end thereof into engagement with the cutter blade 100 and the abutment plate 114.

The sides 20 and 22 of the housing member 14 have extending laterally therefrom in suitably secured relationship adjacent the rear end thereof handles 144 and 146 providing means whereby the apparatus may be propelled on a support surface S upon which the viscous material will be dispensed.

As clearly seen in Figure 3 the support surface may be of a pitched character, as is conventional on roofs upon which a layer of the viscous material is disposed, marble chips, for example, being scattered thereon, and accordingly the vehicular carriage 12 incorporates wheels thereon for compensating for any angular deviations in the support surface over which the apparatus travels.

Suitably secured on the outer surface of the forward wall 24 and extending angularly toward the side 20 of tubular housing member and in substantial planar alignment therewith is a support member 150 incorporating a transverse support axle 152 upon which is journaled a suitable support wheel 154, which may have a rubber tire, for example, suitably mounted thereon, if desired. Suitably secured on the under surface of member 46 is a second support member 156 incorporating a transverse support shaft 158 therethrough upon which is suitably journaled a support wheel 160 in planar alignment with wheel 154 previously mentioned. The side 22 of the housing member has extending laterally therefrom in suitably secured relationship a mounting bolt 162 externally threaded for receiving thereon a clamping nut 164. An elongated support member 166, such as a channel member, for example, incorporates an elongated slot portion 168 through which the bolt 162 extends, the nut 164 being adjusted for permitting vertical adjustment of said support member 166 in the manner indicated by the dotted direction arrow of Figure 3, for the purpose of compensating for angular support surfaces as previously mentioned. The support member 166 has suitably secured in transversely extending relationship a support shaft 170 having journaled thereon a suitable support wheel 172.

Thus there has been disclosed novel apparatus for dispensing a viscous material providing means wherein the dispensing of such material may be readily controlled, a relatively uniform layer of such material being disposed in a ready and expeditious manner with a minimum amount of danger to a person applying the relatively hot viscous material.

The foregoing is considered as illustrative only of the principles of the invention. Further, since numerous modifications and changes will readily occur to those skilled in the art, it is not intended to restrict the invention to the exact disclosure and operation shown and described, and accordingly all suitable modifications and equivalents may be resorted to, falling within the scope of the appended claims.

What is claimed as new is as follows:

1. Apparatus for dispensing a viscous material comprising a vehicular carriage including means for manually propelling the same, a tubular housing member on said carriage, said housing member having a bottom wall and a forward end wall, said forward end wall having a discharge opening inwardly of and adjacent said bottom wall, a discharge nozzle depending from the forward end wall and the bottom wall and in communication with the opening in said forward end wall, said housing member including an open end for inserting therein a severable container containing a viscous material, a container-opening assembly in the housing member for opening the severable container inserted into the tubular housing permitting viscous material disposed therein to flow toward the discharge nozzle, and control means embodying a control plate operatively connected to said discharge nozzle between the ends thereof for slidable projection through the wall of said discharge nozzle and across said discharge nozzle and for slidable retraction from said discharge nozzle and out of the wall of said discharge nozzle for controlling the flow of the viscous material dispensed through the discharge nozzle.

2. Apparatus for dispensing a viscous material comprising a vehicular carriage including means for manually propelling the same, a tubular housing member on said carriage, said housing member having a bottom wall and a forward end wall, said forward end wall having a discharge opening inwardly of and adjacent said bottom wall, a discharge nozzle depending from the forward end wall and bottom wall and in communication with the opening in said forward end wall, said housing member including an open end for inserting therein a severable container containing a viscous material, a container-opening assembly in the housing member for opening the severable container inserted into the tubular housing permitting viscous material disposed therein to flow toward the discharge nozzle, and control means embodying a control plate operatively connected to said discharge nozzle between the ends thereof for slidable projection through the wall of said discharge nozzle and across said discharge nozzle and for slidable retraction from said discharge nozzle and out of the wall of said discharge nozzle for controlling the flow of the viscous material dispensed through the discharge nozzle, said tubular housing member having heating means embedded in the walls thereof for decreasing the viscosity of material dispensed by the apparatus.

3. Apparatus for dispensing a viscous material comprising a vehicular carriage including means for manually propelling the same, a tubular housing member on said carriage including a transverse forward end wall, a discharge nozzle depending from the housing member and communicating with the interior thereof, said housing member including an open end for inserting therein a severable container containing a viscous material, a container-opening assembly in the housing member for opening the severable container inserted into the tubular housing permitting viscous material disposed therein to flow toward the discharge nozzle, and control means operatively connected to said discharge nozzle for controlling the flow of the viscous material dispensed through the discharge nozzle, the forward end wall including a transverse slotted portion adjacent the lower edge thereof, said slotted portion opening into the discharge nozzle, the container-opening assembly comprising a sharpened knife blade extending rearwardly from the inner surface of the forward end wall and bordering the lower edges and sides of said slotted portion for cutting a U-shaped section in the end of a container inserted into the housing member, and an abutment plate at the upper edge of the slotted portion terminating short of the terminal end of the cutting blade and extending angularly toward the cutting blade for pushing the U-shaped section into the container when the container is forced into the tubular housing member.

4. Apparatus for dispensing a viscous material comprising a vehicular carriage including means for manually propelling the same, a tubular housing member on said carriage, said housing member having a bottom wall and a forward end wall, said forward end wall having a discharge opening inwardly of and adjacent said bottom wall, a discharge nozzle depending from the forward end wall and bottom wall and in communication with the opening in said forward end wall, said housing member including an open end for inserting therein a severable container containing a viscous material, a container-opening assembly in the housing member for opening the severable container inserted into the tubular housing permitting viscous material disposed therein to flow toward the discharge nozzle, and control means having a control plate operatively connected to said discharge nozzle intermediate the ends for slidable projection through the wall of said discharge nozzle and across said discharge nozzle and for slidable retraction from said discharge nozzle and out of the wall of said discharge nozzle for controlling the flow of the viscous material dispensed through the discharge nozzle, the open end of the housing member including a cover member pivotally supported thereon for closing said end and retaining heat therein, and screw-tightening means extending between the housing member and a portion of the cover member for retaining the same in closing relationship and for forcibly urging the cover member into engagement with a rear end portion of a container extending out of the housing member for applying pressure thereon to urge the forward end of the container into the container-opening assembly.

References Cited in the file of this patent

UNITED STATES PATENTS

| | | | |
|---|---|---|---|
| 1,095,183 | Beaman | | May 5, 1914 |
| 1,300,400 | Jervis | | Apr. 15, 1919 |
| 2,226,880 | Tramarollo | | Dec. 31, 1940 |
| 2,303,690 | Hall et al. | | Dec. 1, 1942 |
| 2,322,808 | Hothersall | | June 29, 1943 |
| 2,350,836 | Sonnenborn et al. | | June 6, 1944 |
| 2,684,105 | Graves | | July 20, 1954 |
| 2,708,533 | Nicholas | | May 17, 1955 |
| 2,726,630 | Dickerson | | Dec. 13, 1955 |
| 2,746,847 | Stahl | | May 22, 1956 |